US006882677B2

(12) United States Patent
Dehner et al.

(10) Patent No.: US 6,882,677 B2
(45) Date of Patent: Apr. 19, 2005

(54) METHOD AND APPARATUS FOR FACILITATING HANDOFF IN A WIRELESS LOCAL AREA NETWORK

(75) Inventors: Leo Dehner, Southlake, TX (US); Phillip David Neumiller, Cary, IL (US); Richard Allen Comroe, South Barrington, IL (US); Charles W. Bethards, Colleyville, TX (US)

(73) Assignee: Motorola, Inc., Schaumburg, IL (US)

( * ) Notice: Subject to any disclaimer, the term of this patent is extended or adjusted under 35 U.S.C. 154(b) by 344 days.

(21) Appl. No.: 09/795,585

(22) Filed: Feb. 28, 2001

(65) Prior Publication Data

US 2003/0035464 A1 Feb. 20, 2003

(51) Int. Cl.[7] ................................................ H04B 1/69
(52) U.S. Cl. .................... 375/132; 375/133; 375/130; 455/103; 455/440; 455/463; 370/350; 370/341
(58) Field of Search ................................. 375/132, 133; 455/103, 440, 452, 434; 370/329

(56) References Cited

U.S. PATENT DOCUMENTS 4,597,105 A * 6/1986 Freeburg .................... 455/524
5,839,071 A * 11/1998 Johnson ..................... 455/440
6,393,261 B1 * 5/2002 Lewis ........................ 455/103
6,597,671 B1 * 7/2003 Ahmadi et al. ............. 370/329
6,665,536 B1 * 12/2003 Mahany ..................... 455/434

* cited by examiner

Primary Examiner—Shuwang Liu
Assistant Examiner—Eva Zheng
(74) Attorney, Agent, or Firm—Charles W. Bethards; Hisashi D. Watanabe (57) ABSTRACT

A method and apparatus for facilitating handoff from a network access point (NAP) that is arranged and constructed to provide service to a communications unit (CU) in a frequency hopped communications system. The operations that are performed are providing service between the CU and the NAP on a connection using a first frequency hopping pattern (FHP); determining that the connection is suitable for discontinuation based on RSSI or load; sending a first message including an ID for the NAP and schedule for the CU to neighboring NAPS, the message requesting assistance with the service on tho first FHP; and receiving a second message from a neighboring NAP, arranged and constructed to provide connections to CUs using a second FHP, the second message indicating that assistance can be provided by the neighboring NAP.

53 Claims, 6 Drawing Sheets

METHOD AND APPARATUS FOR FACILITATING HANDOFF IN A WIRELESS LOCAL AREA NETWORK

FIELD OF THE INVENTION

This patent concerns wireless local area networks (WLAN) and more particularly devices and methods that provide access to these WLANs for user devices that are mobile.

BACKGROUND OF THE INVENTION

Wireless LANs (WLANs) such as Bluetooth, Home RF, 802.11, etc. are known and being developed. These networks are designed and constructed to provide adhoc wireless access to user devices by way of network access points (NAPs) or devices within a very small coverage area (typically less than 30 feet). Extended coverage over a larger area such as an airport terminal or shopping mall requires the deployment of numerous NAPS each providing overlapping coverage with one or more neighbor NAPs. However no provision has been made to provide continuous service or access for a unit or device that wanders, moves or roams out of range (beyond the coverage area) of a given NAP or access device. Essentially, in part to keep the networks simple and inexpensive, provisions for mobility management, such as handoff from one coverage area to another that may be considered and present in and associated with wide area networks (WANs) such as cellular phone systems have not been included in WLAN specifications and systems.

What is needed are methods and devices that are capable of providing continuous service or WLAN access to user devices as they roam or move through the coverage areas of multiple network access points.

BRIEF DESCRIPTION OF THE DRAWINGS

The accompanying figures, where like reference numerals refer to identical or functionally-similar elements throughout the separate views and which are incorporated in and form part of the specification, further illustrate various embodiments in accordance with the present invention. The figures together with the detailed description, hereinafter below, serve to explain various principles and advantages in accordance with the present invention.

DETAILED DESCRIPTION OF A PREFERRED EMBODIMENT

In overview form the present disclosure concerns wireless LANs or WLANs and providing continuous service to communications units (CUs) operating therein or therewith. The WLANs of particular interest are those employing frequency hopped or hopping techniques to provide service to CUs. Examples of such WLANs include those commonly known as Bluetooth or Home RF WLAN. As further discussed below various inventive principles and combinations thereof are advantageously employed to provide handoff and thus roaming service to CUs operating on such systems provided these principles or equivalents are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore further discussion of such software, if any, will be limited in the interest of brevity and minimization of any risk of obscuring the principles and concepts in accordance with the present invention.

Figure 1:
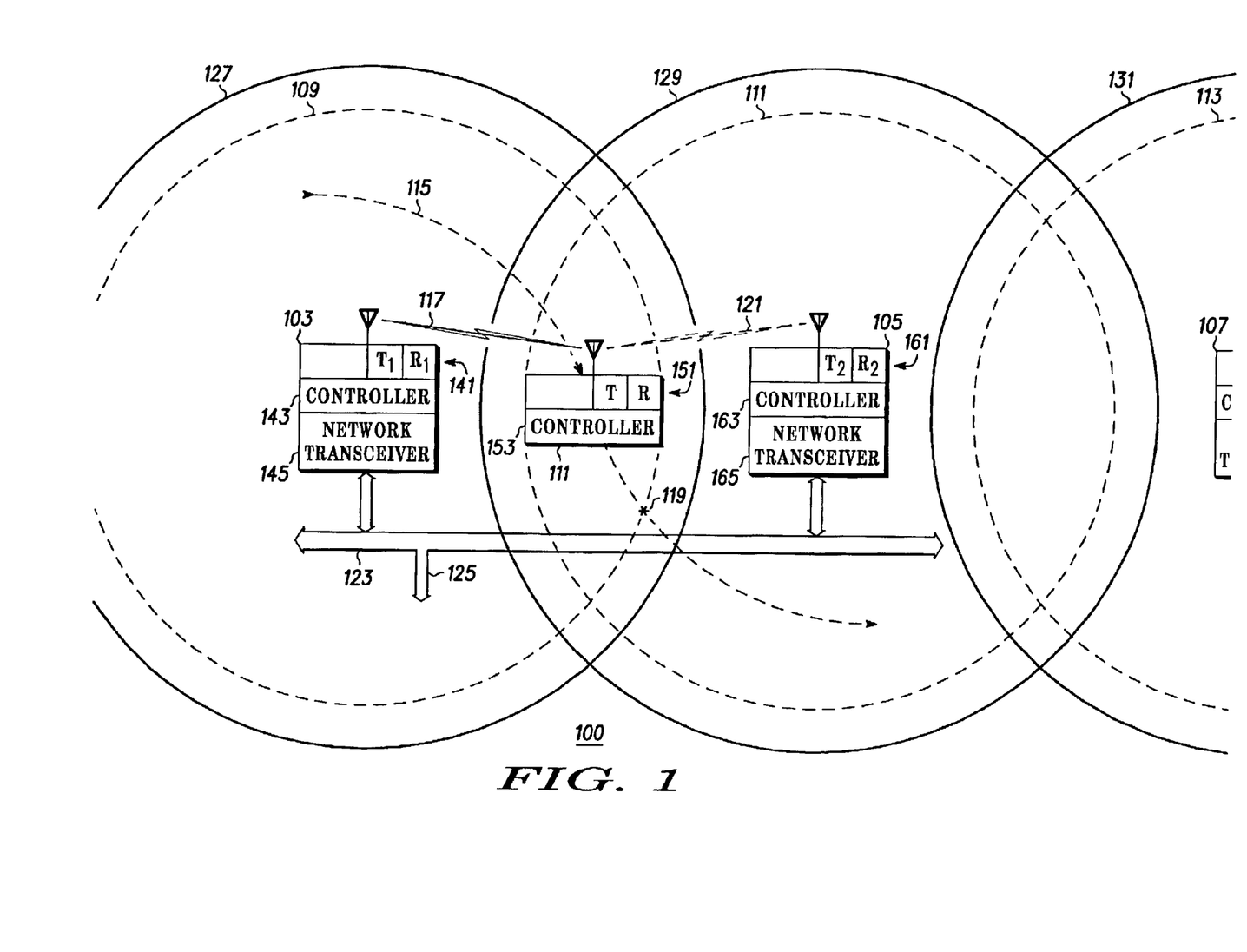
FIG. 1 depicts, in a simplified and representative form, a first embodiment of a wireless local area network in accordance with the present invention.

The present disclosure will discuss various embodiments in accordance with the invention. These embodiments include methods, NAPs, CUs, and communications systems employing each or all of the aforesaid. The system diagram of FIG. 1 will be used to lay the groundwork for a deeper understanding of the present invention and advantages thereof. FIG. 1 in large part and at the simplified level depicted is a representative diagram of a communications system 100, for example, a typical and known Bluetooth WLAN, and will serve to explain the problems and certain inventive solutions thereto according to the present invention.

The communications system 100 of FIG. 1 depicts NAP 103, NAP 105, and NAP 107 each providing coverage or service for communication units, such as CU 111, within there respective coverage areas 109, 111, 113. As CU 111 traverses, for example, path 115, as and in the direction depicted, a radio frequency signal based connection 117 would be established with NAP 103 and service would be provided to CU 111 using this connection. According to known views of WLANs such as Bluetooth, at the limit of coverage area 109, shown as point 119 on path 115 this connection would fail and service would no longer be provided by NAP 103. Service would be lost to CU 111 until a new connection 121 can be established and service resumed with NAP 105. Note that FIG. 1 is dramatically simplified from most practical or real world systems. For example, coverage areas are not likely to be as uniform as indicated and further a given NAP may have a multiplicity of neighboring NAPs rather than one or two as depicted.

As indicated NAPs 103, 105 respectively, have a transceiver (transmitter and receiver) 141, 161 and these transceivers are operably coupled to controllers 143, 163. The controllers 143, 163 are, respectively, coupled to network or local channel transceivers 145, 165 that are each coupled to a local channel 123 which may be coupled to one or more common servers or gateways at 125. The CU 111 includes a transceiver 151 operably coupled to a controller 153. These frequency hopped transceivers, controllers, and local channel transceivers are generally known but modified to operate in accordance with the inventive principles and concepts further discussed herein below.

In operation the WLAN, using Bluetooth protocols, for example, operates as follows. The system operates on a frequency band, preferably, in the 2.4 Ghz range. The operating frequency band in most countries consists of 79 channels (some countries have 23 channels at this date) spaced 1 Mhz apart with a data rate of 1 Mbps using gausian frequency shift keyed (GFSK) modulation. Bluetooth devices, such as the NAPs and CUs of FIG. 1 can form piconets on an adhoc basis where each piconet will have a master and one or more, up to seven, slaves. A master in one piconet can be a slave in a second or more piconets. Each master will have a unique Identification (ID) and this ID determines a unique frequency hopping pattern and phase within that pattern for the piconet associated with that master to operate on.

In a given piconet a master and slave can establish communications connections to facilitate service for the CU. These connections can be asynchronous, isochronous, or synchronous with the former predominantly used for packet or packet switched applications and the latter for continuous or circuit switched applications, such as voice, etc. The connection may be initiated by either the master or slave. As an overview, for example, (full and complete details in the Bluetooth specifications) the slave will broadcast an inquiry sequence and the master will respond with a message indicating supported services and an ID. The slave then completes a service access routine. Generally the master will transmit to a given slave, identified by an address assigned when a connection is established with that slave, during one time slot or frequency hop and receive from that same slave during the subsequent time slot. The master then transmits to another identified slave during the next timeslot or hop and receives during the subsequent slot, etc. When a slave moves beyond the coverage area of the master that is attempting unsuccessfully to provide service by way of the connection, the connection will be dropped by the master and slave after the lapse of a time out period. The slave will enter a further inquiry, service discovery and access sequence in hopes of discovering service available from another piconet or master. Assuming a master is available and responds and has suitable services and available capacity a connection can be established with this master operating on another frequency hopping pattern. Unfortunately this may take a significant amount of time during which connections from the slave to external services such as Web based applications may also have been terminated. For further elaboration, detail, and background please see the Bluetooth specifications available at www.bluetooth.com that are herein incorporated by reference in there entirety as of the date of this application. Specifications for Home RF systems are likewise available over the WWW.

Figure 6:
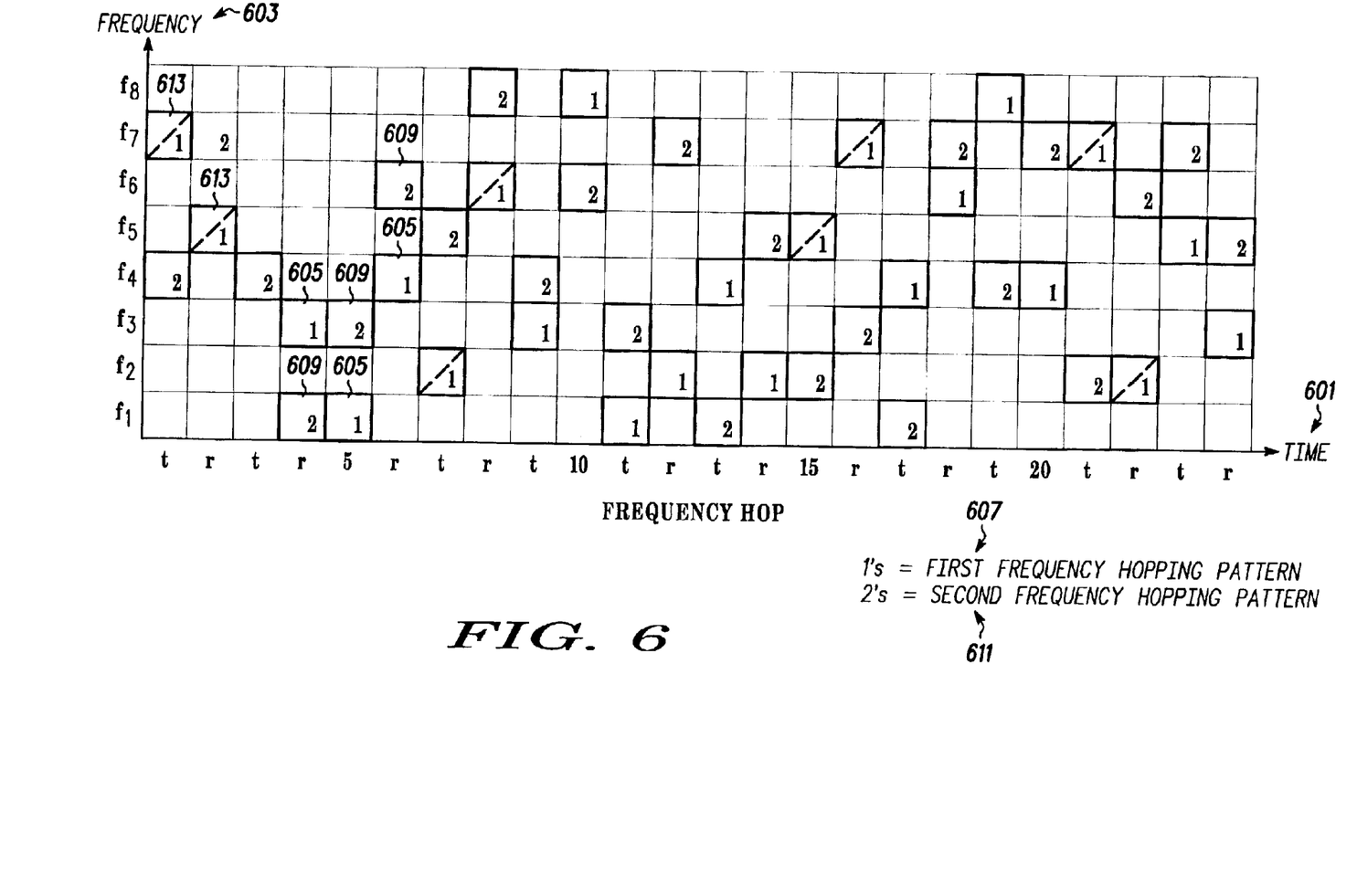
FIG. 6 depicts an exemplary diagram of time or frequency hops versus frequency analogous to those utilized in the FIGS. 1-3 systems.

Within the system 100 of FIG. 1 it is assumed that the NAPs are masters for there, respective, piconets which will encompass or include CUs within there respective coverage areas 109, 111. Thus NAP 103 is a master for a piconet that supports a connection 117 with and provides service to CU 111 when located at the beginning of path 115. The NAP 103 is operating on or according to a first frequency hopping pattern 607 such as depicted in FIG. 6. FIG. 6 shows, by way of example only, a simplified pattern of time or frequency hops on the horizontal axis 601 versus the hop frequency (limited to 8 for simplicity) on the vertical axis 603. The intersections 605 (3 of 24 designated) labeled with a "1" are the frequencies that transceiver 141 will be tuned to at the respective hop times to support various connections and provide service to the CUs within the piconet served by NAP 103. Collectively, the "1"s are the first frequency hopping pattern 607. Similarly the "2"s 609 (3 of 24 designated) are frequencies another or neighbor NAP such as NAP 105 would operate on to provide service to CUs within its piconet. Collectively the "2"s are a second frequency hopping pattern 611.

Also the horizontal axis 601 indicates, with alternating "t" and "r", that the NAP will transmit in odd numbered slots or hops and receive in even numbered slots. In FIG. 6 certain intersections 613 (2 of 8 designated) labeled "1" have a dashed backslash. These represent hops or time slots, specifically 1, 2, 7, 8, 15, 16, 30 21, and 22 where NAP 103 has scheduled service for CU 111, with odd numbered slots being outbound service (NAP transmitting and CU receiving) and even numbered being inbound service (NAP receiving and CU transmitting). Collectively these slots are referred to as a schedule for CU 111 and if they change an updated schedule. The time slots or hops without a backslash represent capacity or resources that may be devoted to servicing other CUs on other connections still using the first frequency hopping pattern or as we will further discuss advantageously providing some level of service to roaming CUs.

Referring once more to the FIG. 1 frequency hopped communications system 100 including NAPs 103, 105, etc., we now discuss the inventive concepts and principles by which the system is rendered capable of and arranged to provide roaming service to communications units (CUs) by facilitating a handoff of service between neighboring NAPs. To begin with each NAP stores a list of the unique ID for each neighbor or adjacent NAP in some form of onboard or locally available memory. This list may be programmed into a NAP at installation or when initially commissioned and periodically updated locally or by remote access via the local channel or alternatively the respective NAPs using the local channel 123 can discover other NAPs and exchange their respective IDs. The local channel is, preferably, a known Ether net channel coupling all NAPs and perhaps other servers or system maintenance equipment together but it could also be a wireless LAN or perhaps a "private" piconet among the NAPs provided that at least neighbor or adjacent NAPs have access to each other. As CU 111 traverses path 115 it establishes, preferably, an active connection 117 with NAP 103 according to the above discussed service access process as explained in more detail in the Bluetooth specifications.

The network access point (NAP) 103 is operating on, for example, the first frequency hopping pattern 607 to support a first connection 117 with and provide service to CU 111. NAP 103 includes the transceiver 141 and a local channel transceiver 145 coupled to a controller 143. The transceiver and controller are arranged to and do assess signal quality, such as received signal strength (RSSI), or bit error rate, etc from the CU 111. In practice NAP 103 may have determined that the signal quality or level has fallen to the point where the connection 117 is at risk should any further deterioration occur or may have determined that traffic loads or demands are such that reducing the present loads is appropriate. In the first case the appropriate or predetermined level would be a level slightly better than prudent link margins would indicate. In the second case this predetermined level may be the next closest signal quality level on the piconet or it may be a level representing an earlier assessed signal quality for the same unit. NAP 103 may determine for these or other reasons that it is appropriate to discontinue service via connection 117 to CU 111. The controller then controls and otherwise causes local channel transceiver 145 to send a request for assistance message on local channel 123 when the signal quality satisfies the predetermined level. The request for assistance message is preferably directed to all neighbor NAPs and includes the ID for the NAP requesting service as well as the schedule for the CU 111.

The system 100 also includes a second NAP 105 operating on a second frequency hopping pattern 611 to support one or more connections (not shown) with and provide service to additional CUs (not shown). The second NAP includes the second transceiver 161 and the second local channel transceiver 165 coupled to the second controller 163. The second local channel transceiver is arranged and constructed to receive the request for assistance from NAP 103 or others requesting assistance from the local channel. The second controller, responsive to the request, directs, controls and otherwise causes the second NAP, specifically transceiver 161, to monitor the connection 117, specifically inbound transmissions from the CU 111 on the first frequency hopping pattern to determine whether assistance is possible. Note in FIG. 1 this monitoring operation pulls resources away from the normal duties of providing service to other CUs in the piconet serviced by NAP 105. The receiver portion of the second transceiver 161 would be tuned to the frequency corresponding to the first frequency hopping pattern and phase (known and determined from the ID of NAP 103) during the hops when service is scheduled from the CU 111. For example referring to FIG. 6, the second transceiver 161 would be tuned to f6 on hop 8, rather than f8; f7 on hop 16, rather f3; and f2 on hop 22, rather than f6. If assistance is possible as, preferably indicated by signal quality and available resources including time to monitor based on the traffic load at NAP 105 then a message is sent to the first NAP 103 identifying the second NAP 105 and offering to provide the assistance.

As will be further discussed below when the message indicating assistance is available is sent to NAP 103 the message preferably includes any information such as data packets that were received by NAP 105 during the monitoring operation. Monitoring and forwarding this information to NAP 103 will, optionally, continue until NAP 103 releases or forwards service for CU 111 to NAP 105. When this optional step is undertaken it may additionally make sense for NAP 105 to monitor the local channel for traffic destined for CU 111 and when detected forward such traffic or information to the CU on the first frequency hopping pattern according to the transmit schedule for the CU 111. Doing both of these operations effectively extends the coverage area for NAP 103 from the area 109 to the area 127, for NAP 105 from the area 111 to the area 129, and for NAP 107 from the area 113 to the area 131. In effect NAP 105 has established a connection 121 or virtual connection with CU 111. In any event it is likely that a time will come for actual transfer of responsibility for service to CU 111. The responsibility will handed off or the service for CU 111 will be handed off from NAP 103 to NAP 105.

This passing of responsibility may be initiated by NAP 103 responsive to the offer to provide assistance or upon a further deterioration or reduction in signal quality such as RSSI or packet quality, etc. or a change in load requirements or demand and would, preferably, take the form of a message over local channel 123 directed to NAP 105 and including a schedule for such transfer of responsibility. Alternatively the transfer or passing of responsibility could be initiated by NAP 105 based on RSSI, favorable loading conditions, etc. and would be indicated by a message over local channel 123 to NAP 103 including timing or a schedule for such transfer.

In any event, given the transfer to NAP 105 various alternatives to continuing to provide service to CU 111 are anticipated. For example NAP 105 can continue to provide service to CU 111 using the first frequency hopping pattern but assuming responsibility for scheduling. In this case NAP 103 can immediately reallocate resources on the first frequency hopped pattern and the system will likely incur a certain amount of increased interference on this pattern. Alternatively NAP 103 can continue to provide assistance (forwarding to NAP 105 received information and retrieving outbound information from the local channel and forwarding to CU 111 via a schedule now established by NAP 105 and sent to NAP 103) with the service to CU 111 on an outbound and inbound basis, thus extending the service areas as above. In the latter case NAP 103 would expect to reallocate the resources (hops or slots or time) devoted to service for CU 111 to other CUs within its piconet but only after the RSSI reading has further decreased to the point that assistance is no longer possible or helpful.

As another example NAP 105 can break the connection with CU 111 and force the CU to reestablish a connection with in this case NAP 105. To minimize the interruption to traffic NAP 105 will continue to receive inbound traffic from the CU but not acknowledge same, buffer outbound traffic for the CU, maintain any connection to other resources via the local channel, and generally expedite the service discovery process with NAP 105 for CU 111 to the extent possible within current Bluetooth specifications. A message indicating the forcing activity from NAP 105 to Nap 103 will allow NAP 103 to more or less immediately reallocate capacity or resources to normal traffic loads with no further risk of increased interference on the first frequency hopping pattern.

As one additional alternative, NAP 105 via the first frequency hopping pattern and virtual connection 121 can instruct CU 111 to proceed to the second frequency hopping pattern and phase at a specific time thus providing truly seamless service for CU 111. By sending this message to NAP 103 as well as the CU 111, NAP 103 can begin using the freed up resources more or less immediately.

Figure 2:
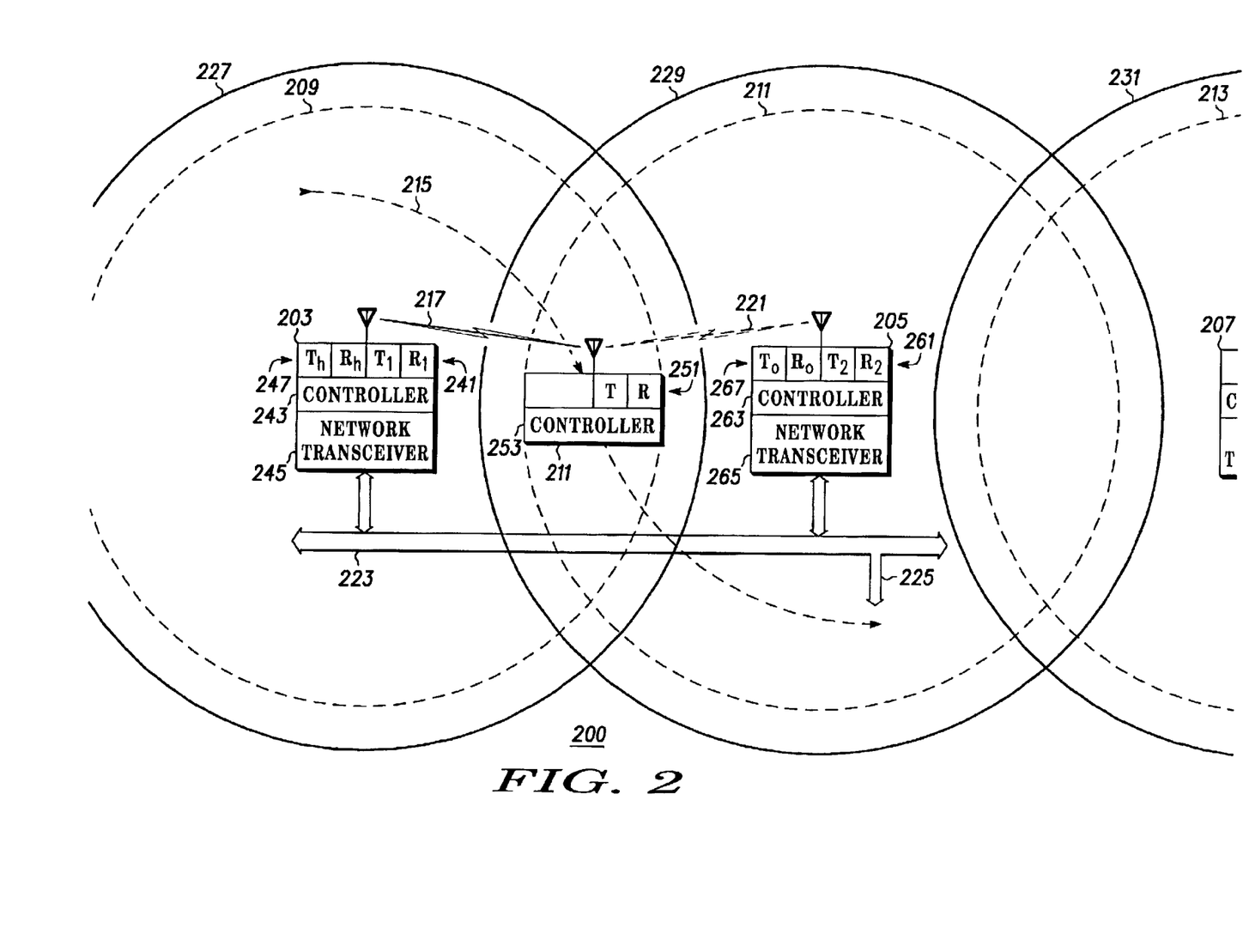
FIG. 2 depicts, in a simplified and representative form, a second and preferred embodiment of a wireless local area network in accordance with the present invention.
Figure 3:
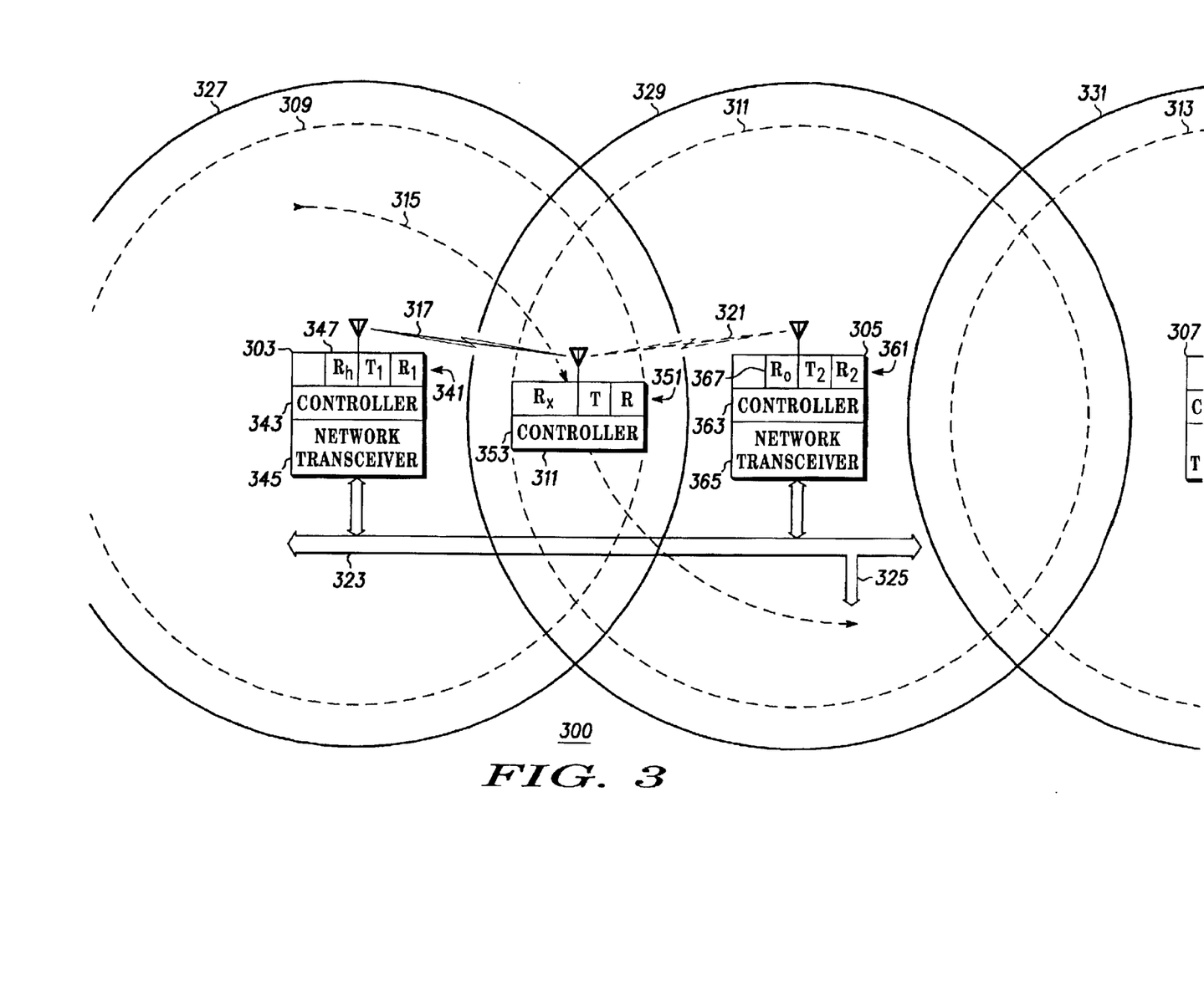
FIG. 3 depicts, in a simplified and representative form, a further embodiment of a wireless local area network in accordance with the present invention.

To avoid the drain on resources resulting from the monitoring, etc. activities that are otherwise normally deployed to service traffic for each NAPs respective piconet, FIG. 2 shows an embodiment where NAPs 203 and 205 each have a second transceiver 247, 267, respectively, with a receiver portion and a transmitter portion. In this instance by using the receiver portion of transceiver 267 as controlled by the controller 263, NAP 205 is controlled or otherwise caused to monitor the first connection 217 for transmissions, on frequency hopping pattern, 607 from the CU 211. The transmitter portion of transceiver 267 may be used to transmit outbound information on the first frequency hopping pattern to CU 211. In sum this transceiver thus allows NAP 205 to monitor and provide assistance to the CU by way of connections 217 and 221 on the first frequency hopping pattern without using resources otherwise used for its normal network traffic. As another variant FIG. 3 shows a system whereby NAPs 303, 305 and CU 311 each include a transceiver 341, 361, 351 as well as a receiver 347, 357, and 367. The extra receiver can be used to provide monitoring on the extra frequency hopping patterns and thus assistance with handoff for roaming traffic. Specifically the CU 311 will use the transceiver 351 to support the first connection 317 and the second receiver 357 for receiving outbound transmissions from the transceiver of NAP 305 on the second frequency hopping pattern. When the CU transmits, the extra receiver 367 at NAP 305 will monitor its transmissions on the frequency hopping pattern normally used by NAP 303. As one last optional embodiment a central scheduler or server (not shown) coupled to the local channel at 125 for example may be utilized whereby each NAP forwards all messages intended for neighbor NAPs to the central server and this server makes all decisions for the respective NAPs as to who needs assistance and when and how to effect such assistance.

FIG. 2 depicts a communications system 200 that is very similar to system 100 of FIG. 1. All reference numerals associated with features that have a similar or analogous function under normal circumstances have reference numerals that have been generated by adding 100 to there respective values from FIG. 1. Thus the communications system 200 of FIG. 2 depicts NAP 203, NAP 205, and NAP 207 each providing coverage or service for communication units, such as CU 211, within there respective coverage areas 209, 211, 213. As CU 211 traverses, for example, path 215, as and in the direction depicted, a radio frequency signal based connection 217 will be established with NAP 203 and service would be provided to CU 211 using this connection. At the limit of coverage area 209 on path 215 this connection would fail and service would no longer be provided by NAP 203. Service would be lost to CU 211 until a new connection 221 can be established and service resumed with NAP 205. Note that FIG. 2, like FIG. 1, is dramatically simplified from most practical or real world systems for the same reasons given with reference to FIG. 1.

As indicated NAPs 203, 205 respectively, have a transceiver (transmitter and receiver) 241, 261 and these transceivers are operably coupled to controllers 243, 263. The controllers 243, 263 are, respectively, coupled to network or local channel transceivers 245, 265 that are each coupled to a local channel 223 which may be coupled to one or more common servers or gateways at 225. One distinction of the NAPs relative to those depicted in FIG. 1 is that NAP 203 has an additional transceiver 247 and NAP 205 has an additional transceiver 267. In sum these additional transceivers are used to provide the monitoring and transmission services that shared the resources or capacity of the single transceivers in NAPs 103 and 105. These additional transceivers will operate on frequency hopping patterns of neighboring NAPs and a given transceiver may operate during different time slots on different neighboring frequency hopping patterns thus providing handoff services to a plurality of roaming CUs without detracting from a NAP's ability to service its local piconet. The CU 211 is essentially equivalent to CU 111 and includes a transceiver 251 operably coupled to a controller 253. These transceivers, controllers, etc. are generally known structurally but in operation have been modified to facilitate handoff of service between NAPs thus providing a roaming CU with continuing and often times seamless or virtually seamless service.

Figure 4:
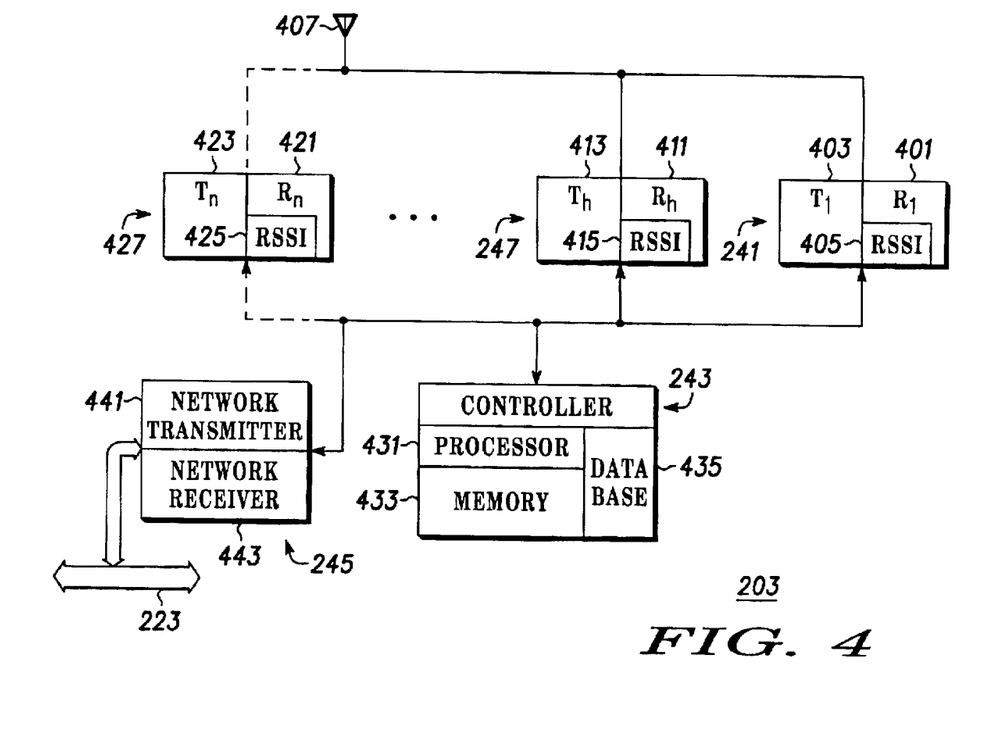
FIG. 4 depicts a more detailed but generalized and simplified block diagram of a preferred embodiment of a network access point (NAP) according to the present invention which NAP is suitable for use in one or more of the FIG. 1–FIG. 3 systems.

Referring to the FIG. 4 block diagram of NAP 203, a more detailed discussion of the structure and operation of this NAP will be undertaken. As noted earlier NAP 203 includes transceiver 241, 247 and may include a multiplicity of transceivers up to an nth transceiver 427. The precise number will depend on the traffic volume and patterns that NAP 203 may experience but each will normally be capable of operating on a distinct frequency hopping pattern. Transceiver 241 includes a receiver 401, with RSSI capability 405, and a transmitter 403 each of which is coupled to an antenna 407. Similarly, transceiver 247 includes receiver 411, with RSSI 415, and transmitter 413 each coupled to antenna 407. Transceiver 427 also include a receiver 421, with RSSI 425, and transmitter 423. All other transceivers (not specifically depicted) are similarly constructed and intercoupled. These transceivers may be constructed and operated according to known techniques for frequency hopped transceivers, modified in accordance with the principles herein. One proposed embodiment for the multiple transceiver NAP is an architecture implemented with a single wide bandwidth transceiver and a signal processor based demodulator/decoder that is used to reconstruct the individual data streams present on the multiplicity of frequency hop sequences.

Each transceiver is shown coupled to a bus and by this bus to controller 243 and local channel transceiver 245. Controller 243 includes a processor 431, preferably a microprocessor based processor, coupled to a memory 433 which includes a database 435. The memory uses known technology and will be utilized for among other purposes, storing software instructions that when executed by the processor result in the controller controlling the operation of the transceivers including the local channel transceiver. The local channel transceiver is preferably an Ethernet transceiver that is coupled to the controller and includes a transmitter 441 and receiver 443 suitable for interface to the local channel 223.

Referring now to the FIG. 2 system 200 and the FIG. 4 block diagram a more detailed discussion of the operation of NAP 203 and 205 will be reviewed. This NAP is arranged and constructed to provide service to a plurality of communications units (CUs) in a frequency hopped communications system and further arranged to facilitate handoff of service for a CU to another NAP. Initially the NAP 203 collects the IDs, from which neighbor frequency hopping patterns and phases may be derived, of adjacent or neighbor NAPs in one or more processes such as discussed above. The CU 211 and NAP establish a connection 217 using the Inquiry and service discovery steps or analogous steps as discussed above. The transceiver 241 provides service between the CU 211 and the NAP 203 on the connection 217 using a first frequency hopping pattern 607 in accordance with Bluetooth or Home RF or analogous protocols and standards.

The controller 243 is coupled to the transceiver 241 and controls, directs, and otherwise causes the transceiver to provide the service. The controller further determines whether the connection is suitable for handoff as a result of the load on the NAP needing to be modified or perhaps as a result of connection quality deteriorating as measured by the RSSI 405 or other signal quality parameters satisfying some threshold. The local channel transceiver 245 also coupled to the controller 243 provides an interface to the local channel 223 and thus to another CU or the PSTN or Web, etc. so as to support the service.

Additionally the local channel transceiver under direction from the controller will send and receive messages from other NAPs pursuant to providing or obtaining assistance with handoffs for roaming CUs. Specifically a message to neighboring NAPS that requests there assistance with the service for CU 211 on the first frequency hopping pattern will be sent if appropriate. This message will preferably include the ID of the NAP which allows a neighbor NAP to determine which frequency hopping pattern the connection 217 utilizes and a schedule for the CU's 211 service. The local channel transceiver also receives messages from other NAPs requesting assistance with service for other CUs (not specifically depicted) on other frequency hopping patterns.

In the process of facilitating a handoff the local channel transceiver will likely receive a response message from a neighbor NAP such as 205 indicating that the assistance as requested can be provided by the neighboring NAP. The response message can include for example one or more of; information that was transmitted by the CU 211 and received in accordance with the schedule by NAP 205; and other information. The other information can include one or more of received signal strength from CU 211 as measured by the receiver portion of transceiver 267, received signal strength trends, availability information, such as a future point in time, for the NAP 205, and a request to assume responsibility for the service. Note that NAP 203 may have to send other messages to NAP 205 such as an updated schedule for the service for the CU 211 or a request for NAP 205 to assume responsibility for the service for the CU.

In addition to receiving information or packets from NAP 205 as noted above, NAP 203 can operate to forward via the local channel transceiver information or packets received from the CU after NAP 205 has assumed responsibility for the service for the CU. Much as discussed above with reference to FIG. 1 the NAP 203 under control of the controller will reschedule capacity of the transceiver 241 to provide service to other CUs on the first frequency hopping pattern upon the occurrence of certain events. Such events include one of: the request for the NAP 205, regardless of where initiated, to assume responsibility for the service; a signal quality for the CU satisfying a, preferably lower threshold; and the CU no longer requiring service as indicated by a handoff from the NAP 205 to NAP 207 for example.

As noted above the controller of the NAP, preferably responsive to a request for assistance but possibly volitionally, will assign resources to monitor other frequency hopping patterns for inbound traffic from other CUs. The NAPs of FIG. 1 will assign a portion of the receiver portion of there respective transceivers while the NAPs of FIG. 2 will assign a receiver portion of there second transceivers and the NAPs of FIG. 3 will utilize there secondary receivers for such monitoring. The NAPs of FIG. 2 can provide complete service for a roaming CU using their second transceivers and continue to provide typical service to CUs within their piconets or coverage areas with one or more of there primary transceivers. Note that interference with a neighbor NAP or piconet will increase over normal situations when a NAP uses the neighbor NAPs frequency hopping pattern. This issue will mitigate in favor of transferring service for a given CU to a frequency hopping pattern that is not generally used in adjacent picocells. This transfer may be accomplished as noted above by either forcing the CU to reestablish service on a new and local pattern or by directing with over the air control signals the CU to move to the local frequency hopping pattern.

From the perspective of a NAP, such as above, that is providing service to a local piconet or picocell and assistance to a CU that is mobile beyond its present piconet we review a NAP, such as NAP 205, where the transceiver 261 provides first service between a first CU (not depicted) and the NAP on a first connection using a first frequency hopping pattern. The controller 263 is coupled to the transceiver and causes the transceiver to provide the first service. In FIG. 1, the solitary transceiver also monitors the service between the roaming CU and the neighbor NAP on a second connection using a second frequency hopping pattern. In FIG. 2 the monitoring task is handled by the receiver portion of transceiver 267 and in FIG. 3 this is handled by the receiver 367. In any event the monitoring operation determines whether the NAP is able to provide assistance with the service on the second connection. A local channel transceiver, coupled to the controller, sends a message to the neighbor NAP indicating that the assistance is available and including an ID for the NAP and quality information corresponding to the signals monitored as well as perhaps inbound information or packets as received from the CU as monitored.

When a second receiver is available for the monitoring activity the transceiver can be fully devoted to providing services to a local piconet. As noted above the monitoring is preferably undertaken responsive to the reception of a request for assistance message including an ID and schedule for the CU from the neighbor NAP. Providing assistance will hinge, for example, on sufficient capacity being available or being made available as well as having satisfactory signal quality.

Also as noted earlier the NAP or controller may cause the local channel transceiver to further send a message to the neighbor NAP indicating that the NAP will assume responsibility for providing the service to the CU or alternatively the local channel transceiver may receive a message from the neighbor NAP directing the NAP to assume responsibility for the service for the CU. Once the NAP assumes responsibility for the service for the CU it will support the service in one of various ways. These include continuing to use the second frequency hopping pattern, breaking the second connection with the CU thereby forcing the CU to seek service using the first frequency hopping pattern, and directing the control CU via the second connection to use a connection on the first frequency hopping pattern. During periods of handoff or providing assistance both NAPs can send outbound information to the CU and receive inbound information therefrom. Specifically the NAP's local channel transceiver will receive outbound information on a local channel that is directed to the neighbor NAP and intended for the CU and the controller will cause the transceiver to send the outbound information to the CU according to the schedule and concurrently with the neighbor NAP. In this manner more or less seamless service can be provided to roaming units otherwise operating in a frequency hopped communications system such as a Bluetooth based wireless local area network (WLAN) and a Home RF based WLAN.

FIG. 3 depicts a further embodiment of a communications system 300 that is arranged and constructed to provide semi seamless service to mobile CUs by facilitating handoff of service between NAPs. Here the NAPs 303, 305 have a second receiver 347, 367, respectively, rather than a second transceiver as in FIG. 2. In addition the CU 311 has a second receiver 357. Otherwise the reference numerals refer to similar or analogous structures from FIG. 2 and have a 3 rather than a 2 at the start of the numerals. Functionally the system 300 operates similar to FIG. 1 with the exceptions noted below.

Figure 5:
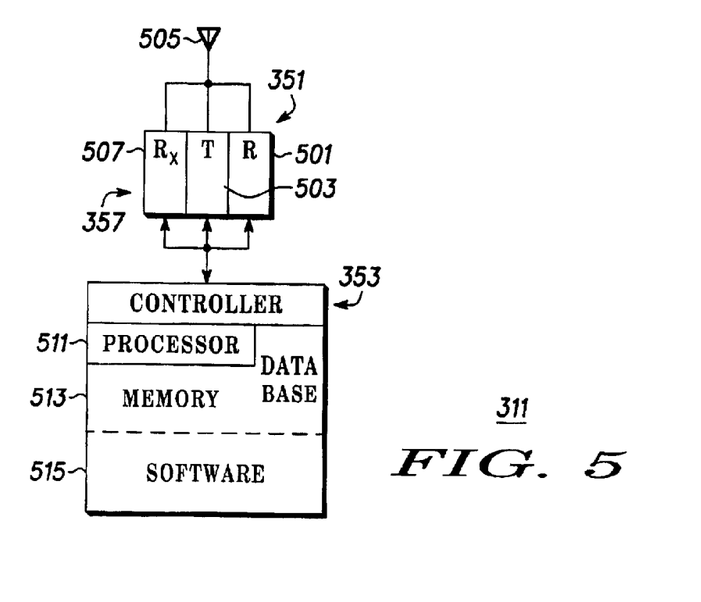
FIG. 5 depicts a more detailed but generalized and simplified block diagram of a preferred embodiment of a communications unit (CU) according to the present invention which CU is suitable for use in one or more of the FIG. 1–FIG. 3 systems.

Referring to FIG. 5 a block diagram of the CU 311 and, with the elimination of the second receiver 307, CU 111 and 211 will be briefly explained. The CU 311 includes a transceiver 357 which includes a receiver 501 and transmitter 503 each of which is coupled to an antenna 505 and controller 353. Additionally a receiver 507 is likewise coupled to the antenna 505 and controller 353. Controller 353 includes a processor 511 and memory 513. The memory 513 includes a database and contains software instructions 515 that when executed by the processor results in the controller controlling the transceiver and receiver. Not depicted but understood to exist in most such CUs is some form of user interface such as a display and keypad.

More particularly referring additionally to FIG. 3 the communications unit (CU) is arranged and constructed to operate in a frequency hopped communications system that supports handoff of service from a first network access point (NAP) 303 to a second NAP 305. The CU includes the transmitter 503 that transmits information to the first NAP 303, specifically transceiver 341 on a first connection 317 using a first frequency hopping pattern 607. Further included is the receiver 501 for receiving information from the first NAP on the first connection; and the controller, coupled to the transmitter and the receiver, for causing the receiver 501 to monitor a second frequency hopping pattern for information for the CU from the second NAP 305.

The CU 111 or 211 is suited for the receiver to receive from either the first NAP 103, 203 or the second NAP 105, 205, a message instructing the CU to establish a second connection using the second frequency hopping pattern with the second NAP 305. Note the CU 311 includes a second receiver, coupled to the controller and this receiver is suitable for being controlled to thereby to cause the second receiver, rather than the receiver, to monitor the second frequency hopping pattern for information for the CU from the second NAP. In this case the second receiver receives from the second NAP, a message instructing the CU to establish a second connection using the second frequency hopping pattern with the second NAP.

Figure 7:
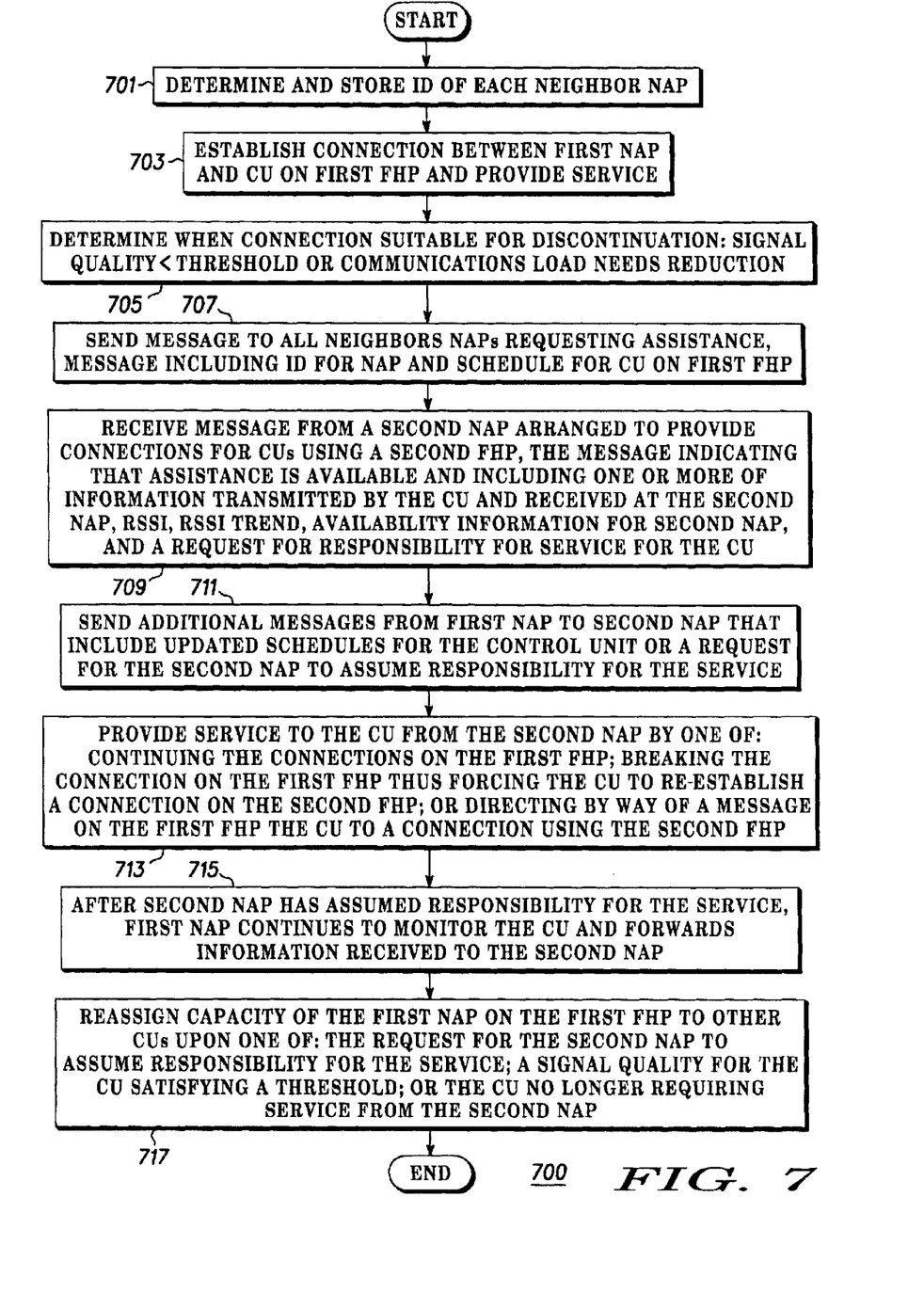
FIG. 7 depicts a process flow chart of a method of providing handoff of communications services in accordance with the present invention.

Referring to the FIG. 7 flow chart, a preferred method embodiment in accordance with the present invention will be discussed. This method 700 is one of facilitating handoff from a network access point (NAP) that is arranged and constructed to provide service to a communications unit (CU) in a frequency hopped communications system. This method may be viewed from the perspective of a NAP that is seeking to handoff service for a CU or from the perspective of a NAP that is the recipient of the service for a CU. The method begins at step 701 where the identification insignia (ID) for each neighboring or adjacent coverage area NAP is determined and stored in a memory, preferably part of each NAP but in any event a memory to which the NAP will have access. At step 703 a $1^{st}$ NAP and a CU establish a connection preferably using the various inquiry and service discovery protocols according to the Bluetooth WLAN specifications or analogous protocols of Home RF WLAN specifications. Using this connection on a $1^{st}$ frequency hopping pattern (FHP) service is provided between the $1^{st}$ NAP and the CU.

Step 705 is devoted to determining whether and when the connection is suitable for discontinuation. This may be judged or determined by, for example, comparing a signal quality such as RSSI to a threshold or alternatively noting that a load at the $1^{st}$ NAP needs to be modified, presumably reduced. Step 707 indicates that the $1^{st}$ Nap sends a message to neighboring NAPs requesting assistance with the service from step 703 on the $1^{st}$ FHP where the message preferably includes an ID for the $1^{st}$ NAP and a schedule for the service to the CU on the $1^{st}$ FHP. Thereafter step 709 shows receiving a message from a neighboring or $2^{nd}$ NAP that is arranged and constructed to provide connections to CUs using a $2^{nd}$ FHP. The message indicating that the assistance can be provided by the $2^{nd}$ NAP and preferably one or more of; information or packets that were transmitted by the CU and received by the 2nd NAP in accordance with the schedule for the CU provided by the $1^{st}$ NAP; and information including one of received signal strength, received signal strength trend such as increasing or otherwise, availability information, such as a hop whereafter service would be available for the CU, from the 2nd NAP, and a request for responsibility for the service, perhaps including suggested timing.

After step 709, step 711 indicates that an additional message may be sent from the $1^{st}$ NAP to the $2^{nd}$ NAP if an update to the schedule for the CU on the $1^{st}$ FHP is needed or if a request or directive for the $2^{nd}$ NAP to assume responsibility for the service is desired. In any event after the $2^{nd}$ NAP has assumed responsibility the service will be provided by one of: continuing the connection to the CU on the $1^{st}$ FHP; breaking the connection with the CU on the $1^{st}$ FHP thereby forcing the CU to reestablish a connection with the $2^{nd}$ NAP on the $2^{nd}$ FHP; or directing by way of a message on the connection using the $1^{st}$ FHP the CU to a further connection using the $2^{nd}$ FHP. Note regardless of the manner in which the service is continued the NAPs and specifically the NAP assuming responsibility will operate to minimize any delays normally associated with service discovery and connection setup for the CU and operate to maintain any connections with outside services including queuing information intended for or any coming from the CU during the reestablishment of a connection.

At step 715, after the $2^{nd}$ NAP has assumed responsibility for the service, the $1^{st}$ NAP will still monitor the CU on the $1^{st}$ FHP and forward information received to the $2^{nd}$ NAP. Step 717 shows reassigning capacity or resources at the $1^{st}$ NAP on the $1^{st}$ FHP to other CUs upon one of: the request for the $2^{nd}$ NAP to assume responsibility for the service; a signal quality for the CU satisfying a presumably lower threshold thus suggesting that possible interference levels at least with the CU are minimized; and the CU no longer requiring service from the $2^{nd}$ NAP as indicated by a further handoff from the $2^{nd}$ NAP. This ends the method 700.

More directly from the perspective of the NAP that is assuming responsibility or the recipient of handoff the method 700 is directed to the same purposes and preferably set in a WLAN. Steps 701 and 703 are similar though this NAP will be providing service for other CUs on a connection using its local FHP or $1^{st}$ FHP. More specifically the method facilitates handoff from a network access point (NAP) that is arranged and constructed to provide service to a communications unit (CU) in a frequency hopped communications system. The method includes providing $1^{st}$ service between a $1^{st}$ CU and the $1^{st}$ NAP on a first connection using a $1^{st}$ FHP; monitoring a $2^{nd}$ service, at the $1$st NAP, between a $2^{nd}$ CU and a $2^{nd}$ or neighbor NAP on a second connection using a $2^{nd}$ FHP; determining that the $1^{st}$ NAP is able to provide assistance with the 2nd service on the second connection; and sending a message to the $2^{nd}$ NAP indicating that assistance is available.

The step of monitoring further includes monitoring using a portion of resources, such as receiver and time slots of the $1^{st}$ NAP otherwise operating on the $1^{st}$ FHP. The step of monitoring may include monitoring using resources, such as a receiver that are normally devoted to operating on one or more neighboring FHPs. The step of monitoring is preferably responsive to a step of receiving a message requesting the assistance from the $2^{nd}$ NAP where the message further includes receiving a schedule corresponding to the second service for the $2^{nd}$ CU. The step of determining normally includes determining that resources are sufficient to provide the requested assistance and that a signal quality from the $2^{nd}$ CU is satisfactory.

Sending the message further includes sending an identification (ID) of the $1^{st}$ NAP together with quality information corresponding to the second service and sending inbound information or packets received from the $2^{nd}$ CU during the step of monitoring. Also preferred is receiving outbound information on a local channel that is directed to the $2^{nd}$ NAP and intended for the $2^{nd}$ CU and sending this outbound information or packets to the $2^{nd}$ CU by way of the $1^{st}$ NAP according to the schedule and concurrently with the $2^{nd}$ NAP.

A further operation is where the $1^{st}$ NAP assumes responsibility for providing the second service for the $2^{nd}$ CU and this may be as a result of or responsive to a message from the $2^{nd}$ NAP or doing so at the discretion of the $1^{st}$ NAP as indicated by a message sent to the $2^{nd}$ NAP. Upon assumption of responsibility the $1^{st}$ NAP will support the second service for the $2^{nd}$ CU by one of continuing to use the $2^{nd}$ FHP, breaking the $2^{nd}$ connection with the $2^{nd}$ CU thereby forcing the $2^{nd}$ CU to seek service using the local or $1^{st}$ FHP, and directing the $2^{nd}$ CU via the $2^{nd}$ connection to use a connection on the $1^{st}$ FHP.

Various embodiments of WLAN communications systems that provide for handoff of service in a frequency hopped environment thus advantageously providing seamless or near seamless service for roaming CUs have been discussed and described. The disclosure extends to the constituent elements or equipment comprising such systems and the methods employed thereby and therein. Using the inventive principles and concepts disclosed herein advantageously allows or provides for load management within the systems as well as near seamless service for users thereof. This disclosure is intended to explain how to fashion and use various embodiments in accordance with the invention rather than to limit the true and intended scope and spirit thereof. The invention is intended to be defined solely by the appended claims, as may be amended during the pendency of this application for patent, and all equivalents thereof.

What is claimed is:

1. A method of facilitating handoff from a network access point (NAP) that is arranged and constructed to provide service to a communications unit (CU) in a frequency hopped communications system, the method including the steps of:
   providing service between the CU and a first NAP on a connection using a first frequency hopping pattern;
   determining that said connection is suitable for discontinuation;
   sending a first message from the first NAP to neighboring NAPS requesting assistance with said service on said first frequency hopping pattern; and
   receiving a second message at the first NAP from a second NAP that is arranged and constructed to provide connections to CUs using a second frequency hopping pattern, said second message indicating that said assistance can be provided by said second NAP.

2. The method of claim 1 wherein said step of determining further includes one of determining that a signal quality has satisfied a threshold and determining that a communications load on said first NAP needs to be reduced.

3. The method of claim 1 wherein said step of receiving said second message further includes receiving one of: information that was transmitted by said CU and received by said second NAP in accordance with a schedule for said CU provided by said first NAP; and information including one of received signal strength, received signal strength trend, availability information for said second NAP, and a request for responsibility for said service.

4. The method of claim 1 wherein said step of sending a first message further includes sending a schedule for said CU on said first frequency hopping pattern.

5. The method of claim 4 further including a step of sending a third message to said second NAP that includes one of an updated schedule for said CU and a request for said second NAP to assume responsibility for said service for said CU.

6. The method of claim 5 further including a step of forwarding information received from said CU to said second NAP after said second NAP has assumed responsibility for said service for said CU.

7. The method of claim 6 further including a step of reassigning capacity at said first NAP on said first frequency hopping pattern to other CUs upon one of: said request for said second NAP to assume responsibility for said service; a signal quality for said CU satisfying a threshold; and said CU no longer requiring service from said second NAP.

8. The method of claim 1 where said step of providing service takes place in one of a Bluetooth based Wireless Local Area Network (WLAN) and a Home RF based WLAN.

9. A method of facilitating handoff from a network access paint (NAP) that is arranged and constructed to provide service to a communications unit (CU) in a frequency hopped communications system, the method including the steps of:
   providing a first service between a first CU and a first NAP on a first connection using a first frequency hopping pattern;
   monitoring a second service, at the first NAP, between a second CU and a second NAP on at second connection using a second frequency hopping pattern;
   determining that the first NAP is able to provide assistance with said second service on said second connection; and
   sending a message to said second NAP indicating that said assistance is available.

10. The method of claim 9 wherein said step of monitoring further includes monitoring using a portion of resources of the first NAP otherwise operating on said first frequency hopping pattern.

11. The method of claim 9 wherein said step of monitoring further includes monitoring using resources normally devoted to operating on one or more neighboring frequency hopping patterns.

12. The method of claim 9 wherein said step of determining further includes determining that resources sufficient to provide said assistance are available and that signal quality from said second CU is satisfactory.

13. The method of claim 9 further including a step of receiving a message requesting said assistance from said second NAP and wherein said step of monitoring is responsive to said step of receiving.

14. The method of claim 13 wherein said step of receiving a message from said second NAP further includes receiving a schedule corresponding to said second service for said second CU.

15. The method of claim 9 wherein said step of sending further includes sending an identification (ID) of said first NAP together with quality information corresponding to said second service.

16. The method of claim 15 further including sending inbound information received from said second CU during said step of monitoring.

17. The method of claim 16 further including said first NAP assuming responsibility for providing said second service for said second CU.

18. The method of claim 17 wherein said assuming responsibility includes one of, doing so responsive to a message from said second NAP and doing so at the discretion of said first NAP as indicated by a message sent to said second NAP.

19. The method of claim 18 wherein upon assumption of responsibility said first NAP supports said second service for said second CU by one of continuing to use said second frequency hopping pattern, breaking said second connection with said second CU thereby forcing said second CU to seek service using said first frequency hopping pattern, and directing said second CU via said second connection to use a connection on said first frequency hopping pattern.

20. The method of claim 16 further including a step of receiving outbound information on a local channel that is directed to said second NAP and intended for said second CU and sending said outbound information to said second CU by way of said first NAP according to said schedule and concurrently with said second NAP.

21. The method of claim 9 wherein the frequency hopped communications system is one of a Bluetooth Based Wireless Local Area Network (WLAN) and a Home RF based WLAN.

22. A frequency hopped communications system capable of providing roaming service to communications units (CUs) comprising in combination:
   a first network access point (NAP) operating on a first frequency hopping pattern to support a first connection with and provide service to a CU, said first NAP further including;
   a transceiver and a local channel transceiver coupled to a controller, the transceiver and controller suitable for assessing signal quality from said CU, said controller causing said local channel transceiver to send a request for assistance on a local channel when said signal quality satisfies a predetermined level; and
   a second NAP operating on a second frequency hopping pattern to support one or more connections with and provide service to additional CUs, said second NAP further including:
      a second transceiver and a second local channel transceiver coupled to a second controller, said second local channel transceiver arranged and constructed to receive said request from said local channel, said second controller, responsive to said request, causing said second NAP to monitor said first connection on said first frequency hopping pattern to determine whether assistance is possible and if so to send a message to said first NAP identifying said second NAP and offering to provide said assistance.

23. The communications system of claim 22 wherein said second NAP monitors said first connection using a receiver portion of said second transceiver according to a schedule for said CU provided with said request for assistance and otherwise operates to service said additional CUs on said second frequency hopping pattern.

24. The communications system of claim 22 wherein said second NAP further includes a receiver that, controlled by said second controller, is caused to monitor said first connection for transmissions from said CU.

25. The communications system of claim 24 wherein said CU further includes a transceiver to support said first connection and a second receiver for receiving outbound transmissions from said second transceiver on said second frequency hopping pattern.

26. The communications system of claim 22 wherein said second NAP further includes a third transceiver that, controlled by said second controller is caused to monitor said first connection and provide said assistance.

27. A network access point (NAP) that is arranged and constructed to provide service to a plurality of communications units (CUs) in a frequency hopped communications system and further arranged to facilitate handoff of service for a CU to another NAP, comprising in combination:
   a transceiver for providing service between the CU and the NAP on a connection using a first frequency hopping pattern;
   a controller coupled to said transceiver, for causing said transceiver to provide said service and for determining that said connection is suitable for handoff; and
   a local channel transceiver, coupled to said controller, for providing an interface to a local channel to support said service, for sending a first message to neighboring NAPS requesting assistance with said service on said first frequency hopping pattern; and for receiving a second message from a second NAP requesting assistance with service for another CU on a second frequency hopping pattern.

28. The NAP of claim 27 wherein said local channel transceiver further operates to receive a response message indicating that said assistance can be provided by a neighboring NAP.

29. The NAP of claim 27 wherein said controller determines that said connection is suitable for handoff by one of determining that a signal quality has satisfied a first threshold and determining that a communications load on said NAP needs to be modified.

30. The NAP of claim 28 wherein said local channel transceiver further sends said first message including a schedule for said CU on said connection using said first frequency hopping pattern.

31. The NAP of claim 30 wherein said local channel transceiver receives said response message including one of; information that was transmitted by said CU and received in accordance with said schedule by said neighbor NAP; and information including one of received signal strength, received signal strength trend, availability information for said neighbor NAP, and a request for responsibility for said service.

32. The NAP of claim 30 wherein said controller operates to cause said local channel transceiver to send a third message to said neighbor NAP that includes one of an updated schedule for said CU and a request for said neighbor NAP to assume responsibility for said service for said CU.

33. The NAP of claim 32 wherein said controller causes said local channel transceiver to forward packets received from said CU to said neighbor NAP after said neighbor NAP bus assumed responsibility for said service for said CU.

34. The NAP of claim 32 wherein said controller reschedules capacity of said transceiver to provide service to other CUs on said first frequency hopping pattern upon one of: said request for said neighbor NAP to assume responsibility for said service; a signal quality for said CU satisfying a threshold; and said CU no longer requiring service from said neighbor NAP.

35. The NAP of claim 27 arranged and constructed to provide service within one of a Bluetooth based Wireless Local Area Network (WLAN) and a Home RF based WLAN.

36. The NAP of claim 27 wherein said controller schedules a portion of a capacity of said transceiver to monitor said second frequency pattern for inbound transmissions from said another CU.

37. The NAP of claim 27 further including a receiver coupled to said controller and controlled thereby for monitoring said second frequency hopping pattern for inbound transmissions from said another CU.

38. The NAP of claim 27 further including a second transceiver for providing service on said second frequency hopping pattern for said another Cu.

39. A network access point (NAP) that is arranged and constructed to provide service to a plurality of communications units (CUs) in a frequency hopped communications system and further arranged to facilitate handoff of service for a CU from a neighbor NAP, the NAP comprising in combination:
- a transceiver for providing first service between a first CU and the NAP on a first connection using a first frequency hopping pattern;
- a controller coupled to said transceiver for causing said transceiver to provide said first service and to monitor the service between the CU and the neighbor NAP on a second connection using a second frequency hopping pattern and for determining that said NAP is able to provide assistance with the service on said second connection; and
- a local channel transceiver coupled to said controller for sending a message to said neighbor NAP indicating that said assistance is available.

40. The NAP of claim 39 further including a second receiver that is controlled by said controller to monitor the service between the CU and the neighbor NAP whereby said transceiver cain be devoted to said first service.

41. The NAP of claim 39 wherein said local channel transceiver receives a request message requesting said assistance from a neighbor NAP and wherein the service is monitored responsive to said request message.

42. The NAP of claim 39 wherein said controller determines that a capacity of said NAP is sufficient to provide said assistance and that signal quality from the CU is satisfactory.

43. The NAP of claim 41 wherein said local channel transceiver as part of said request message further receives a schedule corresponding to the service for the CU.

44. The NAP of claim 43 wherein said local channel transceiver further sends an identification (ID) of said NAP together with quality information corresponding to the service for the CU as monitored at said NAP.

45. The method of claim 44 wherein said local channel transceiver further sends to said neighbor NAP inbound information received from the CU while the service is being monitored at said NAP.

46. The NAP of claim 45 wherein said controller causes said local channel transceiver to further send a message to said neighbor NAP indicating that said NAP will assume responsibility for providing the service to the CU.

47. The NAP of claim 45 wherein said local channel transceiver receives a message from said neighbor NAP directing said NAP to assume responsibility for the service for the CU.

48. The NAP of claim 45 wherein said controller causes the NAP to assume responsibility for the service for the CU and upon so doing supports the service by one of continuing to use said second frequency hopping pattern, breaking said second connection with the CU thereby forcing the CU to seek service using said first frequency hopping pattern, and directing the control CU via said second connection to use a connection on said first frequency hopping pattern.

49. The NAP of claim 45 wherein said local channel transceiver further receives outbound information on a local channel that is directed to said neighbor NAP and intended for the CU and said controller causes said transceiver to send said outbound information to the CU according to said schedule and concurrently with said neighbor NAP.

50. The NAP of claim 39 arranged and constructed to operate in a frequency hopped communications system that is one of a Bluetooth based wireless local area network (WLAN) and a Home RF based WLAN.

51. A communications unit (CU) arranged and constructed to operate in a frequency hopped communications system that supports handoff of service from a first network access point (NAP) to a second NAP, the CU comprising in combination:
- a transmitter for transmitting information to the first NAP on a first connection using a first frequency hopping pattern;
- a receiver for receiving information from the first NAP on said first connection;
- a controller, coupled to said transmitter and said receiver, for causing said receiver to monitor a second frequency hopping pattern for information for the CU from the second NAP; and
- a second receiver, coupled to said controller and controlled thereby to cause said second receiver, rather than said receiver, to monitor said second frequency hopping pattern for information for the CU from the second NAP.

52. The CU of claim 51 wherein said receiver receives from one of the first and the second NAP, a message instructing said CU to establish a second connection using said second frequency hopping pattern with the second NAP.

53. The CU of claim 51 wherein said second receiver receives from the second NAP, a message instructing said CU to establish a second connection using said second frequency hopping pattern with the second NAP.

* * * * *

UNITED STATES PATENT AND TRADEMARK OFFICE
CERTIFICATE OF CORRECTION

PATENT NO. : 6,882,677 B2
DATED : April 19, 2005
INVENTOR(S) : Dehner, Leo et al.

It is certified that error appears in the above-identified patent and that said Letters Patent is hereby corrected as shown below:

Column 14,
Line 35, delete "paint" and replace with -- point --

Column 16,
Line 60, delete "bus" and replace with -- has --

Column 17,
Line 15, delete "Cu" and replace with -- CU --
Line 39, delete "cain" and replace with -- can --

Signed and Sealed this

Fifth Day of July, 2005

JON W. DUDAS
*Director of the United States Patent and Trademark Office*